Feb. 9, 1954 M. ARTMANN 2,668,371
DISPLAY DEVICE
Filed Oct. 23, 1952 2 Sheets-Sheet 1
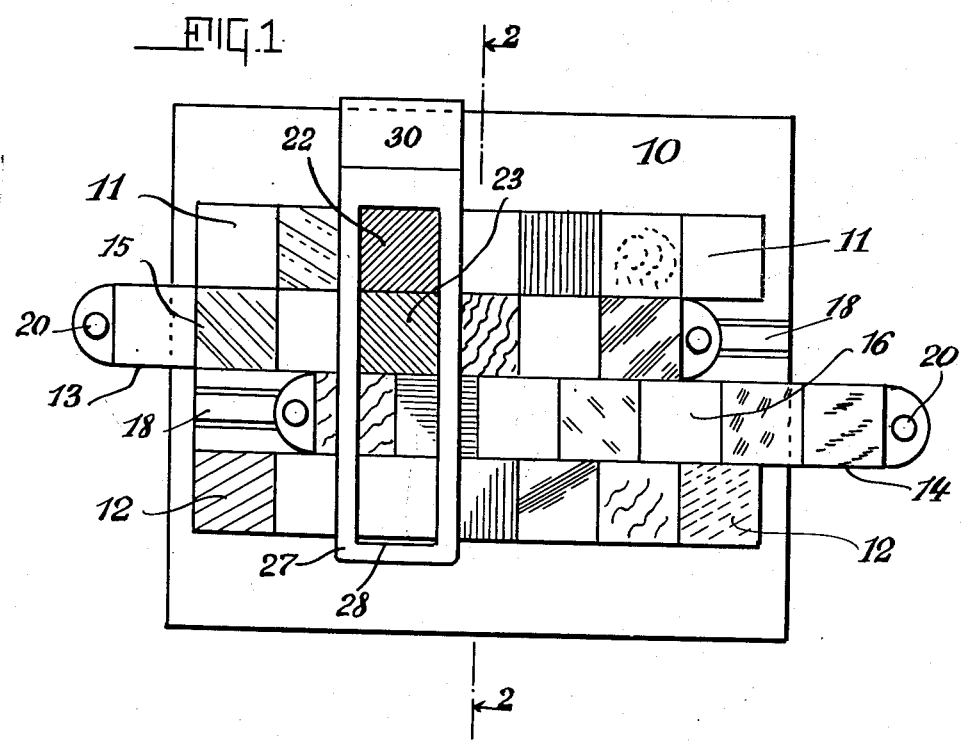
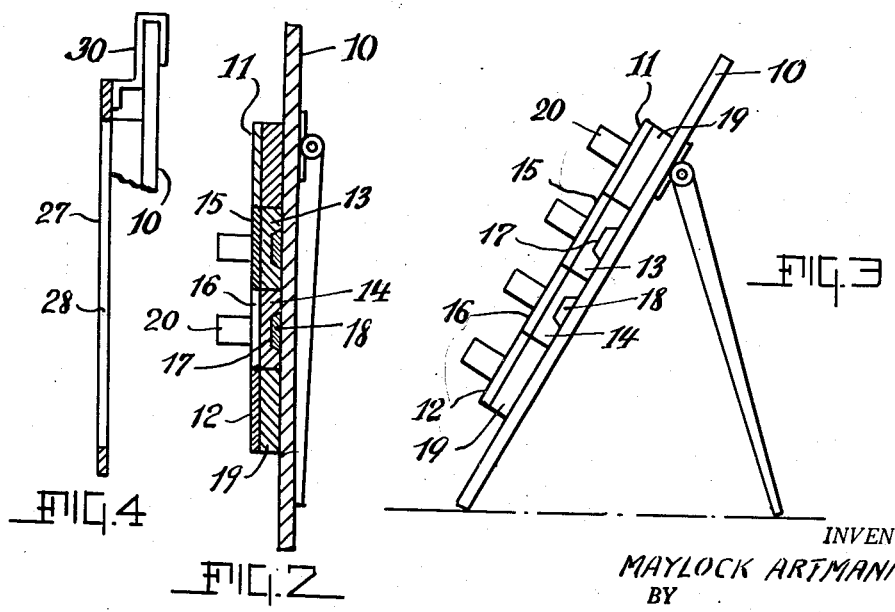
INVENTOR.
MAYLOCK ARTMANN Feb. 9, 1954  M. ARTMANN  2,668,371
DISPLAY DEVICE Filed Oct. 23, 1952  2 Sheets-Sheet 2

INVENTOR.
MAYLOCK ARTMANN
BY

Patented Feb. 9, 1954

2,668,371

UNITED STATES PATENT OFFICE 2,668,371

DISPLAY DEVICE

Maylock Artmann, New York, N. Y.

Application October 23, 1952, Serial No. 316,431

2 Claims. (Cl. 35—53)

This invention relates to a display device particularly adapted for the display of colored tiles. One object of the invention is to provide a display board upon which rows of colored tiles are arranged for display, selection and comparison of colors. The board carries rows of fixed tiles and supports rows of movable tiles. By moving the latter adjacent to the fixed rows of tiles, two or more tiles may be alined and thus matched or contrasted in color effects. The rows of movable tiles may be moved in a straight line or curved line, the fixed tiles being arranged to correspond.

Accordingly the invention is embodied in a display device as hereinafter described and as illustrated in the accompanying drawings in which Fig. 1 is a front view of a display device embodying the invention.

Fig. 2 is a sectional view on the line 2—2 of Fig. 1 with parts omitted.

Fig. 3 is a side view of the device supported by legs in an inclined position like an easel.

Fig. 4 is a sectional view of a masking frame shown in Figure 1.

Figure 5:
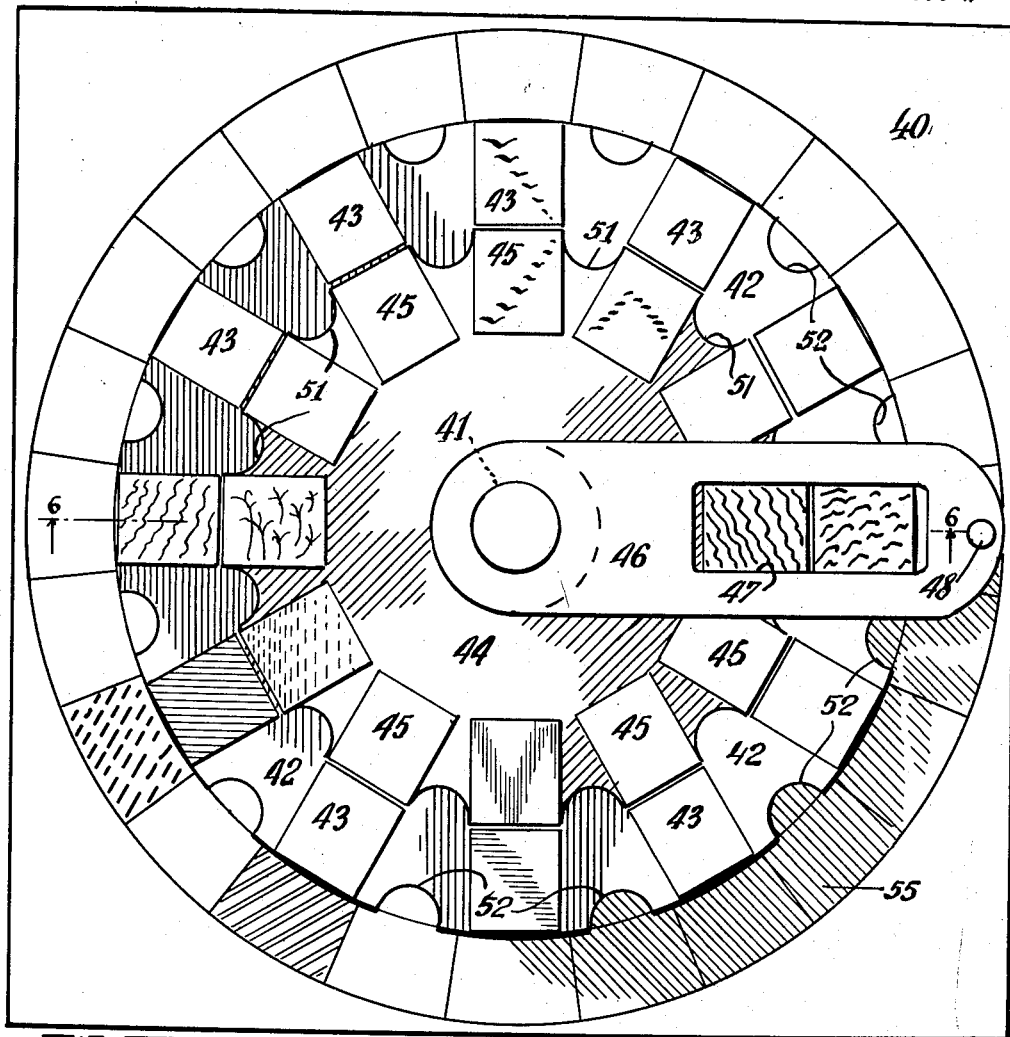
Fig. 5 is a view in elevation of a display device embodying the invention but with the tiles arranged in circles.
Figure 6:
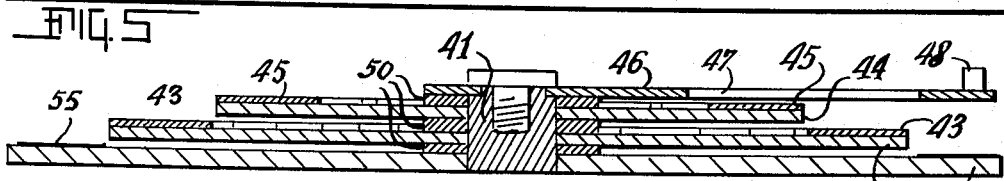
Fig. 6 is a sectional view on the line 6—6 of Fig. 5.

Referring to Figures 1-4, the device comprises a supporting board 10 which forms a background for the tiles. At 11 is shown colored tiles arranged in a row and affixed to the board 10 by any suitable means. At 12 is shown another row of tiles also affixed to the board 10. The two fixed rows of tiles are spaced apart to make room for two movable slides 13 and 14. Each of the slides carries a row of tiles marked 15 and 16, respectively.

The slides 13 and 14 are provided with dovetailed guide grooves 17 which slide upon guiding cleats 18 secured to the board 10. The slides also carry buttons 20 for manually moving the slides in opposite directions across the board between the fixed rows of tiles.

In Fig. 1 the upper slide 13 is shown moved one tile-step to the left in order to align and compare, for example, the two tiles marked 22 and 23, or for the purpose of alining any other two tiles for comparison of colors. The lower slide 14 is shown in the process of being moved to the right in the drawing for the purpose of alining any tile 16 on the slide with any tile in the lower fixed row 12. The fixed tiles 11 and 12 are raised by supporting strips 19 so as to bring them flush with the movable tiles. The board 10 may have hinged legs 25 for its support.

The two alined tiles 22 and 23 in Fig. 1 are shown framed within a masking frame 27 having an opening 28 the width of a tile. The opening extends across the rows of tiles. The frame 27 has a bracket 30 at the top for supporting the frame upon the board 10 in movable and detachable relation, Fig. 4.

Fig. 5 shows the tiles arranged in circles or rings. In this view there is a supporting board 40 having a central shaft or stud 41. Movable about the latter there is a bottom wheel 42 bearing a circle of tiles 43. Above the wheel 42 there is a second, upper, wheel 44 bearing a circle of tiles 45 and above the wheels there is a masking frame 46 also arranged to be rotated about the shaft 41. The masking frame 46 has an opening 47 and a button 48 for moving the frame above the tiles. The two wheels and the masking frame are separated by suitable washers 50 for easy circular movement about the shaft 41.

The upper wheel 44 is provided with finger grips 51 between the tiles 45. The lower wheel 42 has finger grips 52 between the tiles 43. The exhibitor may thus move the wheels of tiles by merely taking hold of the finger grips as will be understood. The board 40 may have a circle 55 of tiles or colored squares of different colors for matching and comparison with relation to a suitable background.

Any two tiles 43 and 45 may be alined for comparison without using the masking frame by simple rotation of the respective tile wheels. The tiles may also be moved to match any colored square in the circle 55.

Figure 7:
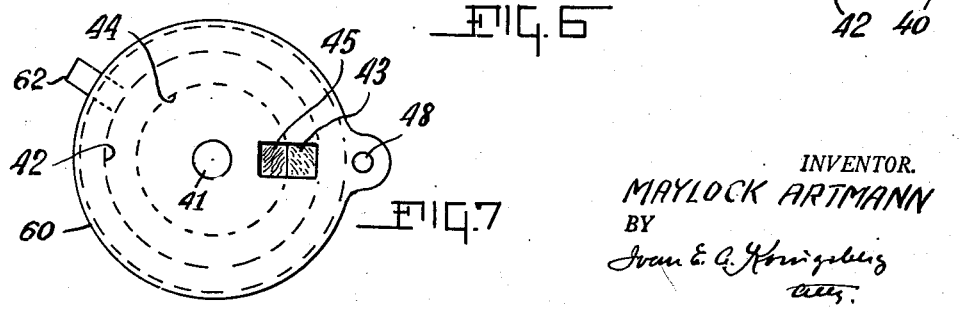
Fig. 7 shows a modification.

It may be found desirable to provide a masking frame which excludes all but selected tiles from view. Fig. 7 shows such a masking frame 60 which is mounted rotatably about the shaft 41. When the frame 60 is used, the lower wheel may be provided with one or more finger grips 62 for rotating the wheel, while the upper wheel may be rotated by its finger grips appearing within the opening in the masking frame 60.

The device disclosed herein is particularly well adapted for the display of colored tiles in matching or contrasting colors. Other objects than tiles may of course be displayed in the same manner. The background board in Fig. 5 may have supporting legs like the board in Fig. 1. Only a few of the tiles are shown colored, it being unnecessary to color them all.

I claim:

1. A display device of the character described comprising a background board, an upper row of colored tiles secured to said board, a lower row of colored tiles secured to said board parallel to said upper row and spaced therefrom, two guiding cleats secured to said board between the said two rows of tiles parallel therewith and spaced an equal distance from each of said rows, two slides having dovetailed longitudinal grooves engaging said guiding cleats for movement thereupon between and with relation to said rows of tiles, other tiles secured to the said slides to form movable rows of tiles, buttons at the ends of said slides for moving the same with relation to the said upper and lower rows of tiles whereby to align any two or more of the said tiles for comparison of colors, legs on said board for supporting the same in an upright display position, the surfaces of said tiles being substantially flush one with the other.

2. A display device according to claim 1 including a masking frame, a bracket on said frame for movably and detachably supporting said frame upon the said board, said frame having an opening the width of a tile, said opening extending across the rows of fixed and movable tiles on said board.

MAYLOCK ARTMANN.

References Cited in the file of this patent

UNITED STATES PATENTS

| Number | Name | Date |
|---|---|---|
| 1,636,991 | Fueglin | July 26, 1927 |
| 1,802,102 | Ziegler | Apr. 21, 1931 |
| 2,011,843 | Butler | Aug. 20, 1935 |
| 2,013,741 | Butler | Sept. 10, 1935 |
| 2,628,435 | Minninger | Feb. 17, 1953 |

FOREIGN PATENTS

| Number | Country | Date |
|---|---|---|
| 440,834 | Great Britain | Jan. 7, 1936 |